(12) United States Patent  (10) Patent No.: US 8,425,708 B2
Rubin et al.  (45) Date of Patent: Apr. 23, 2013

(54) CONTINUOUS FABRICATION OF PARTS USING IN-FEED SPOOLS OF FIBER REINFORCED THERMOPLASTIC

(75) Inventors: Alexander M. Rubin, St. Louis, MO (US); James R. Fox, Florissant, MO (US); Randall D. Wilkerson, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 771 days.

(21) Appl. No.: 11/697,378

(22) Filed: Apr. 6, 2007

(65) Prior Publication Data

US 2007/0175572 A1 Aug. 2, 2007

Related U.S. Application Data

(63) Continuation-in-part of application No. 11/347,122, filed on Feb. 2, 2006, now Pat. No. 7,807,005.

(51) Int. Cl.
*B29C 53/48* (2006.01)

(52) U.S. Cl.
USPC ........... 156/212; 156/221; 156/222; 156/223; 156/226; 156/227; 156/228; 156/264; 156/265; 156/266; 156/304.1; 156/304.6

(58) Field of Classification Search .................. 156/196, 156/212, 201, 221–223, 290, 291, 226–228, 156/264–266, 304.1, 304.6; 428/105, 300.7
See application file for complete search history.

(56) References Cited

U.S. PATENT DOCUMENTS

| 2,440,228 A | 4/1948 | Yardeny et al. |
| 2,708,288 A | 5/1955 | Fuller et al. |
| 4,061,817 A | 12/1977 | Maxel |
| 4,151,031 A * | 4/1979 | Goad et al. ............. 156/201 |
| 4,414,266 A | 11/1983 | Archer et al. |
| 4,414,269 A | 11/1983 | Lubowitz et al. |
| 4,462,946 A | 7/1984 | Goldsworthy |

(Continued)

FOREIGN PATENT DOCUMENTS

| BE | 834458 | 2/1976 |
| DE | 1504302 A1 | 4/1969 |

(Continued)

OTHER PUBLICATIONS

Thermoplastic Composite Sheet Forming Alfred C. Loos and Romesh C Batra, Department of Engineering Science and Mechanics, VA Polytechnic Institute and State University, Blacksburg, VA 24061.

(Continued)

*Primary Examiner* — Christopher Schatz
(74) *Attorney, Agent, or Firm* — Yee & Associates, P.C.

(57) ABSTRACT

Thermoplastic composite laminate parts with tailored and varying thickness and/or curved sections are manufactured in a continuous process. Automated equipment or hand lay-up is used to collate parts or components into a multi-layer stack. Each stack contains all plies, including ply build-up areas, tacked in the proper location to maintain orientation and location. Some or all of the plies may be continuously fed from spools of single or multiply ply material. Ply consolidation tooling contains all necessary part features and is coordinated to the customized multiple ply stacks to form a single integrated thermoplastic composite laminate potentially having areas of differing thickness from the multiple ply stacks.

7 Claims, 10 Drawing Sheets

U.S. PATENT DOCUMENTS

| | | | | |
|---|---|---|---|---|
| 4,571,355 A * | 2/1986 | Elrod | ..................... | 428/102 |
| 4,608,220 A | 8/1986 | Caldwell et al. | | |
| 4,674,712 A | 6/1987 | Whitener et al. | | |
| 4,749,613 A | 6/1988 | Yamada et al. | | |
| 4,759,815 A | 7/1988 | Frey | | |
| 4,818,460 A | 4/1989 | Nied | | |
| 4,913,910 A | 4/1990 | McCarville et al. | | |
| 5,021,283 A | 6/1991 | Takenaka et al. | | |
| 5,026,447 A | 6/1991 | O'Connor | | |
| 5,026,514 A | 6/1991 | Hauwiller et al. | | |
| 5,043,128 A | 8/1991 | Umeda | | |
| 5,057,175 A | 10/1991 | Ashton | | |
| 5,064,439 A | 11/1991 | Chang et al. | | |
| 5,139,407 A | 8/1992 | Kim et al. | | |
| 5,182,060 A | 1/1993 | Berecz | | |
| 5,192,330 A | 3/1993 | Chang et al. | | |
| 5,413,472 A | 5/1995 | Dietterich et al. | | |
| 5,681,513 A | 10/1997 | Farley | | |
| 5,716,487 A | 2/1998 | Sumerak | | |
| 5,759,325 A | 6/1998 | Davis | | |
| 5,820,804 A * | 10/1998 | Elmaleh | ..................... | 264/167 |
| 5,958,550 A | 9/1999 | Childress | | |
| 6,007,917 A | 12/1999 | Weigel et al. | | |
| 6,024,555 A | 2/2000 | Goodridge et al. | | |
| 6,162,314 A * | 12/2000 | Kassuelke et al. | ............ | 156/182 |
| 6,291,049 B1 | 9/2001 | Kunkel et al. | | |
| 6,319,346 B1 | 11/2001 | Clark et al. | | |
| 6,425,969 B1 * | 7/2002 | van den Akker | .............. | 156/177 |
| 6,689,448 B2 | 2/2004 | George et al. | | |
| 6,696,009 B2 | 2/2004 | Davis | | |
| 6,764,057 B2 | 7/2004 | Fanucci et al. | | |
| 6,869,558 B2 | 3/2005 | Polk, Jr. et al. | | |
| 7,186,361 B2 | 3/2007 | Kasai et al. | | |
| 7,191,982 B2 | 3/2007 | Vetillard et al. | | |
| 7,300,693 B2 | 11/2007 | Albers et al. | | |
| 7,419,372 B2 | 9/2008 | Kasai et al. | | |
| 7,431,875 B2 | 10/2008 | Rule | | |
| 7,513,769 B2 | 4/2009 | Benson et al. | | |
| 7,670,525 B2 | 3/2010 | Weidmann et al. | | |
| 7,807,005 B2 | 10/2010 | Rubin et al. | | |
| 7,871,553 B2 | 1/2011 | Wilkerson et al. | | |
| 8,151,529 B2 | 4/2012 | Weidmann et al. | | |
| 8,163,221 B2 | 4/2012 | Suzuki et al. | | |
| 2002/0088549 A1 | 7/2002 | Fanucci et al. | | |
| 2002/0135093 A1 | 9/2002 | Davis | | |
| 2003/0044570 A1* | 3/2003 | George et al. | ................ | 428/105 |
| 2003/0168555 A1 | 9/2003 | Livi et al. | | |
| 2003/0175520 A1 | 9/2003 | Grutta et al. | | |
| 2003/0232176 A1 | 12/2003 | Polk, Jr. et al. | | |
| 2004/0009338 A1* | 1/2004 | Jo et al. | ................ | 428/297.4 |
| 2004/0096535 A1 | 5/2004 | Hudecek et al. | | |
| 2005/0029707 A1 | 2/2005 | Kasai et al. | | |
| 2005/0053765 A1 | 3/2005 | Albers et al. | | |
| 2005/0056362 A1* | 3/2005 | Benson et al. | ................ | 156/163 |
| 2005/0252603 A1 | 11/2005 | Rule | | |
| 2006/0011289 A1 | 1/2006 | Suriano | | |
| 2006/0083806 A1 | 4/2006 | Kasai et al. | | |
| 2006/0216480 A1 | 9/2006 | Weidmann et al. | | |
| 2006/0226288 A1 | 10/2006 | Vetillard et al. | | |
| 2006/0249868 A1 | 11/2006 | Brown et al. | | |
| 2007/0175571 A1 | 8/2007 | Rubin et al. | | |
| 2007/0175573 A1 | 8/2007 | Fox et al. | | |
| 2007/0175575 A1 | 8/2007 | Rubin et al. | | |
| 2008/0168619 A1 | 7/2008 | Gonzalez et al. | | |
| 2008/0185756 A1 | 8/2008 | Wilkerson et al. | | |
| 2008/0277058 A1 | 11/2008 | Schmier, II et al. | | |
| 2009/0065977 A1 | 3/2009 | Suzuki et al. | | |
| 2009/0074905 A1 | 3/2009 | Matsen et al. | | |
| 2009/0078362 A1 | 3/2009 | Wilkerson et al. | | |
| 2010/0148005 A1 | 6/2010 | Weidmann et al. | | |
| 2010/0225016 A1 | 9/2010 | Prebil et al. | | |
| 2010/0319841 A1 | 12/2010 | Rubin et al. | | |
| 2011/0206906 A1 | 8/2011 | Rubin et al. | | |
| 2012/0175049 A1 | 7/2012 | Suzuki et al. | | |

FOREIGN PATENT DOCUMENTS

| | | |
|---|---|---|
| DE | 1629830 A1 | 1/1971 |
| DE | 2165470 A1 | 7/1973 |
| DE | 2647821 A1 | 4/1978 |
| DE | 3709480 A1 | 10/1988 |
| DE | 4017978 | 9/1993 |
| DE | 29711917 U1 | 8/1997 |
| EP | 0024895 A2 | 3/1971 |
| EP | 0277727 A1 | 8/1988 |
| EP | 0317861 A2 | 5/1989 |
| EP | 1336469 A1 | 8/2003 |
| EP | 1504880 A1 | 2/2005 |
| EP | 1614624 A1 | 1/2006 |
| EP | 1666353 A1 | 6/2006 |
| EP | 1813404 A2 | 8/2007 |
| EP | 1995040 A1 | 11/2008 |
| EP | 2014448 A2 | 1/2009 |
| FR | 2587649 A1 | 3/1987 |
| FR | 2888155 A1 | 1/2007 |
| GB | 531357 | 1/1941 |
| GB | 1157239 | 7/1969 |
| WO | 8302085 A1 | 6/1983 |
| WO | 8810186 A1 | 12/1988 |
| WO | 2007092371 A2 | 8/2007 |
| WO | 2008073164 A2 | 6/2008 |
| WO | 2008094227 A1 | 8/2008 |
| WO | 2008097847 A1 | 8/2008 |
| WO | 2010101744 A2 | 9/2010 |
| WO | 2011106117 A1 | 9/2011 |

OTHER PUBLICATIONS

International Search Report dated Oct. 23, 2007, regarding Application No. PCT/US2007/003021 (WO2007092371), 3 pages.

International Search Report dated Oct. 27, 2008, regarding Application No. PCT/US2007/018611 (WO2008073164), 3 pages.

International Search Report dated Mar. 31, 2008, regarding Application No. PCT/US2007/022234 (WO2008094227), 3 pages.

International Search Report dated Jul. 17, 2008, regarding Application No. PCT/US2008/052806 (WO2008097847), 2 pages.

International Search Report dated Oct. 28, 2010, regarding Application No. PCT/US2010/025176 (WO2010101744), 5 pages.

International Search Report dated Apr. 28, 2011, regarding Application No. PCT/US2011/022003 (WO2011106117), 3 pages.

Prebil et al., USPTO U.S. Appl. No. 13/419,187, filed Mar. 13, 2012, 67 pages.

Preliminary Amendment, dated Aug. 1, 2008, regarding U.S. Appl. No. 11/347,122, 39 pages.

USPTO Office Action, dated Mar. 12, 2009, regarding U.S. Appl. No. 11/347,122, 16 pages.

Response to Office Action, dated Apr. 6, 2009, regarding U.S. Appl. No. 11/347,122, 14 pages.

USPTO Final Office Action, dated Jul. 9, 2009, regarding U.S. Appl. No. 11/347,122, 8 pages.

Response to Final Office Action, dated Sep. 9, 2009, regarding U.S. Appl. No. 11/347,122, 13 pages.

USPTO Office Action, dated Nov. 23, 2009, regarding U.S. Appl. No. 11/347,122, 9 pages.

Response to Office Action, dated Mar. 19, 2010, regarding U.S. Appl. No. 11/347,122, 16 pages.

USPTO Final Office Action, dated Jun. 24, 2010, regarding U.S. Appl. No. 11/347,122, 12 pages.

Response to Final Office Action, dated Jun. 29, 2010, regarding U.S. Appl. No. 11/347,122, 9 pages.

USPTO Notice of Allowance, dated Jul. 21, 2010, regarding U.S. Appl. No. 11/347,122, 6 pages.

USPTO Office Action, dated Feb. 4, 2010, regarding U.S. Appl. No. 11/584,923, 16 pages.

USPTO Final Office Action, dated Jul. 13, 2010, regarding U.S. Appl. No. 11/584,923, 12 pages.

USPTO Office Action, dated Jul. 27, 2011, regarding U.S. Appl. No. 11/584,923, 10 pages.

USPTO Office Action, dated Feb. 2, 2010, regarding U.S. Appl. No. 11/699,653, 15 pages.

USPTO Final Office Action, dated Jul. 16, 2010, regarding U.S. Appl. No. 11/699,653, 10 pages.
USPTO Office Action, dated Feb. 16, 2011, regarding U.S. Appl. No. 11/699,653, 12 pages.
USPTO Final Office Action, dated Jul. 7, 2011, regarding U.S. Appl. No. 11/699,653, 14 pages.
USPTO Office Action, dated Oct. 1, 2009, regarding U.S. Appl. No. 11/701,789, 17 pages.
USPTO Final Office Action, dated Mar. 25, 2010, regarding U.S. Appl. No. 11/701,789, 15 pages.
USPTO Office Action, dated Jun. 21, 2010, regarding U.S. Appl. No. 11/701,789, 11 pages.
USPTO Final Office Action, dated Dec. 29, 2010, regarding U.S. Appl. No. 11/701,789, 14 pages.
USPTO Office Action, dated Apr. 20, 2011, regarding U.S. Appl. No. 11/701,789, 15 pages.
USPTO Final Office Action, dated Oct. 12, 2011, regarding U.S. Appl. No. 11/701,789, 17 pages.
USPTO Office Action, dated Sep. 11, 2009, regarding U.S. Appl. No. 11/859,057, 10 pages.
USPTO Final Office Action, dated Mar. 23, 2010, regarding U.S. Appl. No. 11/859,057, 10 pages.
USPTO Notice of Allowance, dated Oct. 4, 2010, regarding U.S. Appl. No. 11/859,057, 9 pages.
USPTO Office Action, dated Jan. 24, 2011, regarding U.S. Appl. No. 12/398,071, 14 pages.
USPTO Final Office Action, dated Jun. 8, 2011, regarding U.S. Appl. No. 12/398,071, 9 pages.
USPTO Office Action, dated Dec. 16, 2011, regarding U.S. Appl. No. 12/711,401, 21 pages.
USPTO Final Office Action dated Jun. 15, 2012 regarding U.S. Appl. No. 12/711,401, 33 pages.
USPTO Final Office Action dated Jul. 5, 2012 regarding U.S. Appl. No. 11/701,789, 30 pages.
USPTO Notice of Allowance dated Jul. 25, 2012 regarding U.S. Appl. No. 11/584,923, 19 pages.
Rubin et al., "Method for Fabricating Thermoplastic Composite Parts," USPTO U.S. Appl. No. 13/673,989 and Preliminary Amendment, filed Nov. 9, 2012, 52 pages.
European Patent Office Communication, dated Aug. 9, 2011, regarding Application No. EP08728832.0, 5 pages.
Final Office Action, dated Apr. 16, 2012, regarding USPTO U.S. Appl. No. 11/584,923, 9 pages.
Cai et al., "Consolidation Techniques and Cure Control," In: Handbook of Composites, Second Edition, Peters (Ed), Chapman & Hall, London, 1998, pp. 576-577.
Final Office Action, dated Dec. 13, 2012, regarding U.S. Appl. No. 11/701,789, 9 pages.
Office Action, dated Feb. 20, 2013, regarding U.S. Appl. No. 12/398,071, 24 pages.
Office Action, dated Jan. 18, 2013 regarding U.S. Appl. No. 12/711,401, 32 pages.

* cited by examiner

CONTINUOUS FABRICATION OF PARTS USING IN-FEED SPOOLS OF FIBER REINFORCED THERMOPLASTIC

CROSS REFERENCE TO RELATED APPLICATIONS

This application is a continuation-in-part of U.S. patent application Ser. No. 11/347,122, filed Feb. 2, 2006 now U.S. Pat. No. 7,807,005.

TECHNICAL FIELD

This disclosure generally relates to fabrication processes using plastic materials, and more specifically to a method for the continuous fabrication of parts using in-feed spools of continuous fiber reinforced thermoplastic material.

BACKGROUND

Numerous processes exist for the fabrication of Thermoplastic composite (TPC) laminates of constant thickness and straight length. In addition to non-continuous processes such as pressing, stamping and autoclave forming, continuous processes exist, such as extrusion, pultrusion, roll forming, and compression molding. Although these latter processes are capable of producing parts in continuous lengths, they lack the ability to produce parts having varying thickness and/or curvature along their length that are needed for lightweight aerospace structures and other structures where weight is of particular importance. Moreover, these continuous fabrication processes rely on the in-feed of multiple discrete lengths TPC materials to form features of an individual part. Thus, the discrete lengths of TPC must be cut, sorted, labeled, stored and individually fed into the machine performing the continuous fabrication process. The use of discrete lengths of TPC material reduces automation of the fabrication process, increases factory space requirements and may add to material costs.

Accordingly, a need exists for a method for continuous fabrication of TPC laminate parts, including those with tailored thicknesses and/or curvature that reduce or eliminate the need for feeding discrete lengths of TPC materials. Illustrated embodiments of the disclosure are intended to satisfy this need.

SUMMARY

According to the disclosed embodiments, a method is provided for manufacturing a reinforced thermoplastic part in a continuous process in which thermoplastic materials from one or more spools are continuously fed into processing equipment used to pre-form and then consolidate the part, in a continuous process. By continuously feeding the thermoplastic materials from spools, the manufacturing process is more fully automated, and the need for cutting, sizing, labeling, sorting and storing individual lengths of the thermoplastic materials may be reduced or eliminated.

In one embodiment, a method is provided for manufacturing a reinforced thermoplastic laminate part in a continuous process. The method comprises the steps of: continuously feeding thermoplastic materials from at least two spools into a pre-forming structure; pre-forming the part in the pre-forming structure using the materials being continuously fed; feeding the pre-formed part through a press; and, pressing the pre-formed part to compact the thermoplastic materials. The method may further include forming a length of multi-ply reinforced thermoplastic material, and winding the multi-ply length onto at least one of the two spools. The plies may be tacked together along their length so that they remain registered, and unwind from the spools as a single length of material. The plies in the material on each spool may contain reinforcing fibers arranged at differing angles relative to a reference direction of orientation. The spooled lengths of thermoplastic material may be fed along with pre-formed, multi-ply stacks of composite materials into the pre-forming structure. Following pre-forming, the part is consolidated in a continuously operating press, such as a continuous compression molding machine.

In accordance with another embodiment, a method is provided for manufacturing a thermoplastic composite part, comprising the steps of: continuously feeding multiple rolls of reinforced thermoplastic plies into a pre-forming structure; feeding tooling into the pre-forming structure as the plies are being fed; pre-forming the part while the plies are being fed; feeding the pre-formed part into a press; and, pressing the pre-formed part to compact the plies. The method may further include the steps of forming first and second lengths of fiber reinforced thermoplastic plies, joining together the first and second lengths of the plies in face-to-face relationship, and winding the joined lengths onto a spool. The plies may be tacked together at spaced apart locations in order to maintain their relative registration and assure that the plies may be unwound together. The plies of each spool may include reinforcing fibers arranged at differing angles of orientation in order to improve part strength and rigidity.

According to still another embodiment, a manufacturing method is provided, comprising the steps of: forming a roll of fiber reinforced thermoplastic material having at least two plies; continuously feeding material from the formed roll into a pre-forming structure; pre-forming a part in a pre-forming structure as the material is being continuously fed; and, consolidating the pre-formed part. The roll of fiber reinforced thermoplastic material may be formed by placing two plies in face-to-face relationship, attaching the plies together, and winding the attached plies onto a spool. Fiber orientation in one of the plies may be altered relative to fibers in another ply by dividing one of the plies into sections, rotating the sections and then reattaching the sections.

The disclosed method may be employed to manufacture a variety of parts including, for example, structural beams having a variety of cross sectional geometries, tailored thicknesses and curvature.

Other features, benefits and advantages of the embodiments will become apparent from the following description, when viewed in accordance with the attached drawings and appended claims.

BRIEF DESCRIPTION OF THE ILLUSTRATIONS

DETAILED DESCRIPTION

The illustrated embodiments provide a novel fabrication method of forming a thermoplastic composite ("TPC") laminate material with tailored and varying thicknesses in a continuous process. The embodiments find applicable uses in a wide variety of potential applications, including for example, in the aerospace industry. The disclosed method is ideally suited for forming thermoplastic composite stiffened members in the supporting framework of an aircraft fuselage. Potential examples of thermoplastic composite stiffened members include but are not limited to fuselage skins, wing skins, control surfaces, door panels and access panels. Stiffening members include but are not limited to keel beams, floor beams, and deck beams. For illustrative purposes only, the method will initially be described in reference to forming a thermoplastic composite floor beam 20 for use in a commercial aircraft fuselage. However, while an I-section is shown, other stiffened member geometries such as Z-section, U-section, T-section, etc. will also be later described, including those having curvature along their length.

Figures 1, 2:
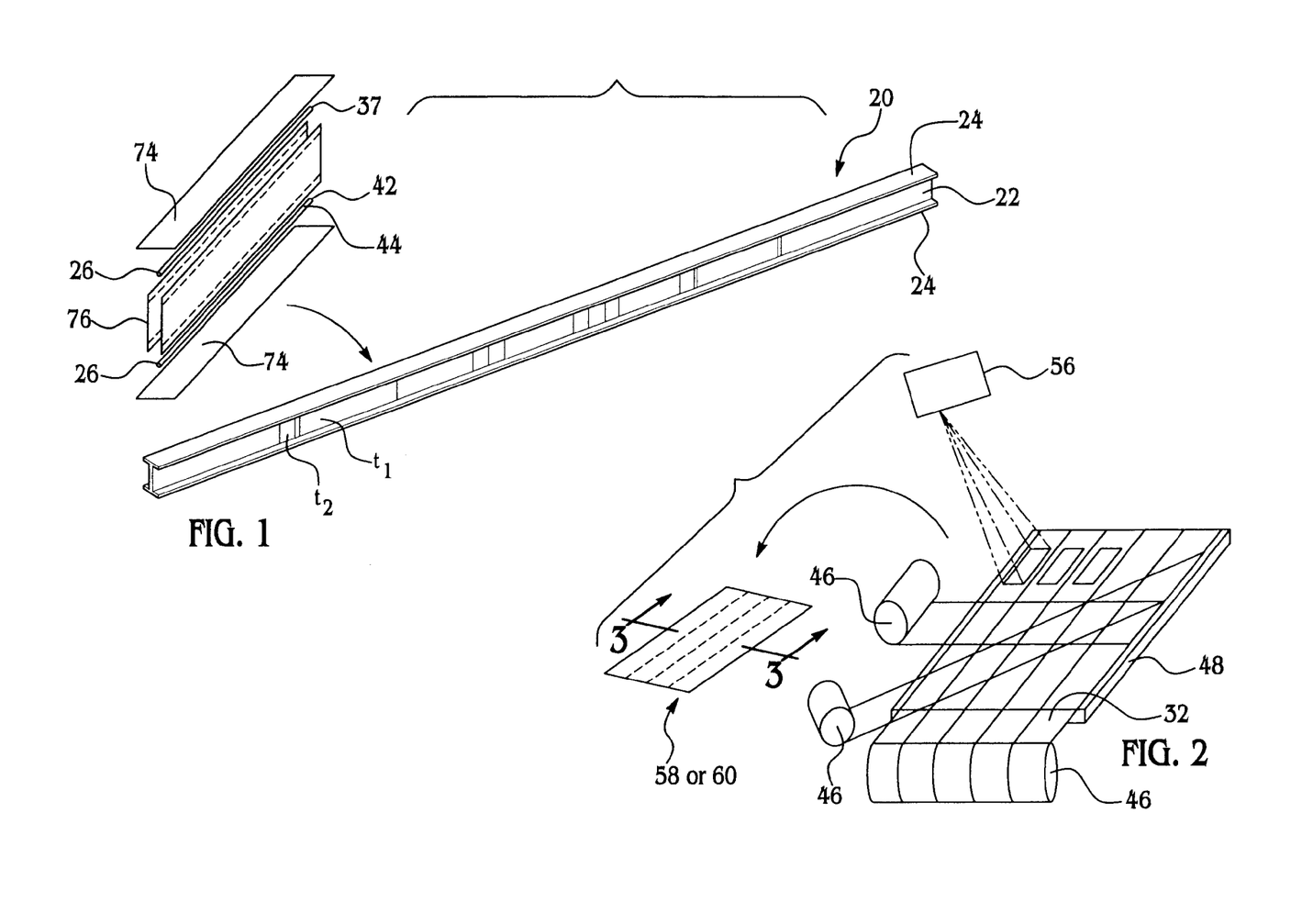
FIG. 1 is an exploded, perspective illustration of a thermoplastic composite laminate formed in accordance with one embodiment of the disclosure.
FIG. 2 is a perspective illustration of a conveyor table used to form a tailored multilayer stack.

Referring now to FIG. 1, a thermoplastic composite laminate, here a thermoplastic composite laminate floor beam 20 having tailored and varying thickness regions t1 and t2 is illustrated as having a web region 22 coupled at either end to a respective pair of cap regions 24. The web region 22 and pair of cap regions 24 are formed as a single integrated laminate structure by consolidating a pair of non-uniform thickness tacked multi-layer ply sheet stacks 76 with a pair of thermoplastic composite filler nuggets 26 and further with a pair of uniform thickness tacked multi-layer ply sheet stacks 74. Although sheet stack 76 is shown as comprising 2 plies, it is to be understood that either of the sheet stacks 74 and 76 may include any number of plies, depending on the application. It will also be understood that cap regions 24, which are shown in FIG. 1 as having a uniform thickness and one ply, may similarly be provided with regions of varying thicknesses and/or a plurality of plies.

In alternative versions (not shown), a thermoplastic composite laminate such as the floor beam 20 may alternatively be formed by consolidating one or more uniform or non-uniform tacked multi-layer ply sheets 74,76 with either one or more single ply (shown as 32 in FIGS. 2 and 3) of a thermoplastic composite material 30, one or more partial ply (shown as 34 in FIG. 3) of a thermoplastic material 30, or one or more uniform or non-uniform thickness tacked multi-layer tacked stacks 74, 76, and any combination thereof, in a similar method to that described herein. Further, one or more filler nuggets 26 may also be used in combination thereof to form further alternative versions of the thermoplastic composite laminate 20. The method for forming the thermoplastic composite floor beam 20 as shown in FIG. 1 is described below in more detail in conjunction with FIGS. 2-6.

The thermoplastic materials 30 used in plies 32, 34 include thermoplastic matrix polymers (shown as 40 in FIG. 3) such as polyetheretherketone ("PEEK"), polyetherketoneketone ("PEKK"), polyphenylsulfone ("PPS"), polyetherimide ("PEI") preferably reinforced with a fibrous component (shown as 38 in FIG. 3) such as glass (s-type or e-type) or carbon fiber. The fibers 38 within each ply 32, 34 of the thermoplastic materials 30 may be oriented in a unidirectional or non-uniform arrangement, depending upon the particular application. As one of ordinary skill recognizes, the relative types, thicknesses, amounts of fibers 38 within the matrix resin 40, as well as the type of matrix resin utilized in each ply 32, 34 may vary greatly, based on numerous factors, including cost and the ultimate desired physical and mechanical properties of the thermoplastic laminate composite 20. Further, the relative orientation of the unidirectional fibers in one ply 32, 34 relative to another ply 32, 34 may also affect the mechanical properties of the thermoplastic composite laminate 20.

The nuggets 26 are preferably formed from a thermoplastic material 37 that is compatible with the thermoplastic material 30 via extrusion or other well-known forming process. Preferably the matrix resin composition 42 of the nuggets 26 is the same as the matrix resin composition 40 of the materials 30. In addition, the filler nuggets 26 may utilize fibers 44 similar to the fibers 38 contained within the thermoplastic material 30.

Referring now to the logic flow diagram (FIG. 6) and the processing diagrams (FIGS. 2-5), the method for forming the TPC laminate floor beam 20 of FIG. 1 begins in Step 150 by providing preformed plies 32, 34 of the thermoplastic materials 30 and preformed filler nuggets 26 each retained on roller 46 or other retention devices.

Next, in Step 160, multiple plies 32, 34 of the thermoplastic materials 30 are stacked in a desired configuration to form either a non-uniform thickness or uniform thickness untacked multi-layer ply sheet stack 58 or 60 using either a hand lay-up or automated process.

In the automated process, as shown in FIG. 2, a plurality of plies 32 or 34 (FIG. 3) of the thermoplastic material 30 are unrolled from rollers 46 onto a conveyor table 48 to form a collated multi-layer non-uniform thickness or uniform thickness multi-layer ply stack 58 or 60. The rollers 46 may be situated at one end, or along the sides of the conveyor table 48 to lay respective ply layers 32, 34 at a particular orientation with respect to another adjacent layer 32, 34. Thus, for example, a lower layer of a full ply 32 may be laid having unidirectional fibers 38 extending in one direction, while the next respective upper full ply 32 may have unidirectional fibers 38 laid in another direction (for example, at 45 or 90 degrees relative to the underlying ply 32). A laser projector 56 located above the conveyor table 48 ensures proper location of the local or partial plies 34 and/or pockets 36 relative to the full plies 32.

Figure 3:
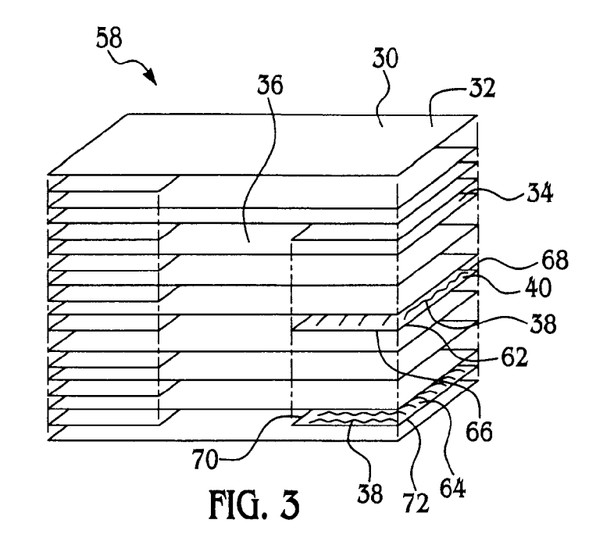
FIG. 3 is a perspective illustration of one example of a tailored multi-layer stack formed in FIG. 2.

An example of an untacked, non-uniform thickness multi-layer sheet stack 58 made according to the process of FIG. 2 is shown in FIG. 3, which shows various full and partial plies 32, 34 and further showing pockets 36 created between plies 32, 34. Moreover, FIG. 3 shows partial plies 62, 64 having unidirectional fibers 38 laid in a 90-degree relative orientation with respect to one another, here showing partial ply 62 laid in a first orientation (fibers 38 extending from front 66 to back 68), while partial ply 64 is laid in a different orientation (fibers 38 extending from side 70 to side 72). Of course, while not shown, plies may have fibers 38 at other relative orientations to one another, ranging from perpendicular to one another (i.e. a 0/90 arrangement) to parallel with one another (i.e. a 0/0 arrangement) and every conceivable angle therebetween (including, for example a 0/30 orientation, a 0/60, 0, 45, 90 orientation etc.).

Next, in Step 170, some or all of various plies 32, 34 of the untacked stacks 58, 60 formed in FIG. 2 may be tacked together at various predetermined locations to form either a uniform or non-uniform thickness tacked multi-layer ply sheet stack 74, 76. Preferably, the stacks 58, 60 are tacked together using a soldering iron or ultrasonic welder (not shown) to form the respective stack 74, 76, although other devices used to couple together various plies 32, 34 of thermoplastic materials known to those of ordinary skill are also specifically contemplated. The amount and location of tacking among the plies 32, 34 are dependent upon numerous factors, including but not limited to the number and location of the various plies 32, 34 and pockets 64. Moreover, the amount of tacking should be sufficient to form a substantially integrated tacked stack 74, 76 that can be transported as a single part.

In Step 175, the tacked stacks 74, 76 may then be cut into smaller pieces, or are ready for use in forming the thermoplastic composite laminates such as floor beam 20 of FIG. 1.

Next, in Step 180, a combination of at least one uniform or non-uniform thickness tacked stack 74, 76, and at least one of either a non-uniform thickness tacked stack 76, a uniform thickness tacked stack 74, or a single ply 32, and optionally at least one filler nugget 26 of thermoplastic material 30, 37 are fused together in a consolidation structure 78 to form a single integrated thermoplastic composite laminate such as floor beam 20. One preferred consolidation structure 78 specifically designed to form the thermoplastic composite laminate floor beam 20 of FIG. 1 is illustrated in FIGS. 4 and 5 below.

Figure 4:
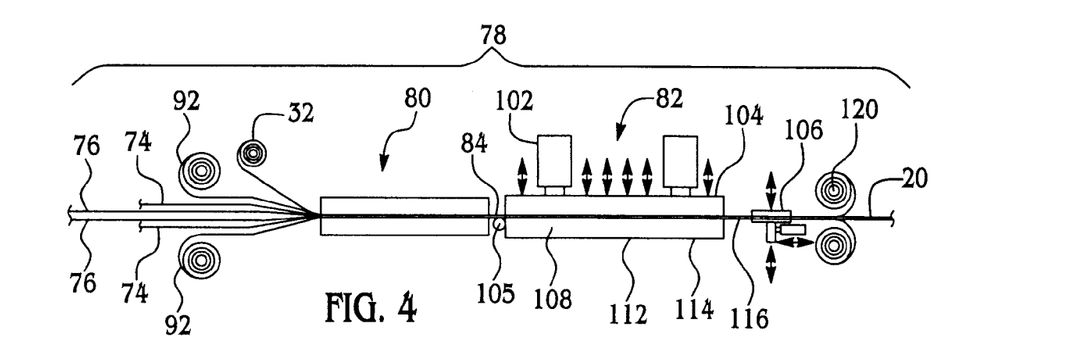
FIG. 4 is an illustration of a pre-forming zone and a consolidation zone of a consolidation structure used to form the thermoplastic composite laminate of FIG. 1.
Figure 5:
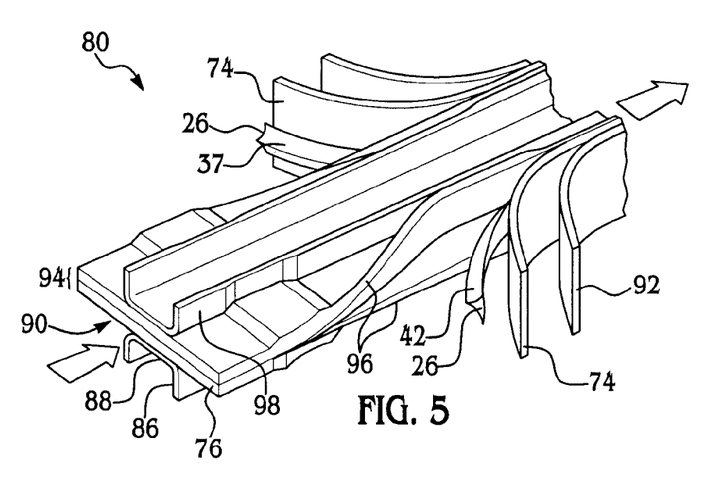
FIG. 5 is a perspective illustration of the pre-forming zone of the consolidation structure of FIG. 4.

Referring now to FIGS. 4 and 5, the consolidation structure 78 may include a pre-forming zone 80 and a consolidation zone 82. In the performing zone 80, a combination of at least one uniform or non-uniform thickness tacked stack 74, 76, optionally at least one filler nugget 26, and at least one of either a non-uniform thickness tacked stack 76, a uniform thickness tacked stack 74, or a single ply 32, FIGS. 2 and 3, of thermoplastic material are loaded in their proper orientations in a continuous process and preformed to the desired shape at an elevated temperature to form the preformed part 84. The preformed part 84 then exits the performing zone 80 and enters the consolidation zone 82, wherein it is consolidated to form a single, integrated thermoplastic composite laminate such as floor beam 20 as described in FIG. 1 above. The elevated temperature used in performing the part should be sufficiently high to cause softening of the tacked stacks 74, 76 or the single ply 32 so that the layers may be bent during the performing process. However, the elevated temperature should be below a temperature at which the polymeric component of the matrix resin 40, 42 has the consistency of a viscous liquid.

Referring now to FIG. 5, the pre-forming zone 80 of the consolidation structure 78 includes a pair of U-shaped tooling channels 86 having a central portion 88 separated by a gap 90 and a pair of side-tooling sheet members 92. Sheet members 92 may also be called mandrels 92. Preferably, the channels 86 and side-tooling sheet members 92 are formed of materials such as stainless steel and the like, that are capable of handling repetitious, high-heat cycles.

A first pair 94 of tacked stacks 74 or 76 is introduced between the respective central portions 88 and within the gap 90 of the U-shaped channels 86. At the same time, an optional filler nugget 26 and either the additional tacked stack 74 or 76 or ply 32, are introduced along each flange 96 of the first pair 94 and within the respective side-tooling member 92. For the purposes of description in the following paragraphs with respect to the illustrations of FIGS. 4 and 5, the non-uniform thickness tacked stack 76 is shown as the first pair 94 introduced within the gap 90. The uniform thickness tacked stack 74 is shown being introduced at a position between the outer portion 98 of the U-shaped channels 86 and respective side-tooling member 92. Further, the ply layer 32 is not depicted in this description. While not shown, the U-shaped channels 86 include ramps and other features designed to match the laminate thickness variations (corresponding to t1 and t2 in FIG. 1) of the particular material (here the first pair 94 of non-uniform tacked stacks 76).

As the tacked stacks 74, 76 and nuggets 26 move through the performing zone 80 towards the consolidation zone 82, the flanges 96 of the first pair 94 of non-uniform thickness tacked stacks 76 on either side of the u-shaped channel 86 are bent outwardly under heat and pressure away from each other towards the respective outer portions 98 of the U-shaped channel 86. The flanges 96 are therefore coupled flat against the inner side of the uniform or non-uniform thickness tacked stacks 76, with the nuggets 26 located between the flanges 96 and the respective inner end of the uniform or non-uniform thickness tacked stacks 76. The heat within the pre-forming zone 80 is elevated sufficiently to allow deformation of the flanges 96 of the non-uniform thickness tacked stacks 76, but is below the temperature in which the polymeric component of the matrix resin 40, 42 of the respective stacks 74, 76 and nuggets 26 has the consistency of a viscous liquid. Bending of the flanges 96 is initiated by pressure applied to the flange 96 by external forming devices such as rollers (not shown). The side-tooling sheet members 92 squeeze the tacked stack 74 inwardly against the flange 96, causing additional pressure to be applied to the flange 96 which aids in bending the flange 96. The preformed part 84 is then ready to move to the consolidation zone 82.

As best shown in FIG. 4, the preformed part 84 enters a separate or connected consolidating structure 102 within consolidation zone 82 on guide roller 105. The consolidating structure 102 includes a plurality of standardized tooling dies generally indicated at 104 that are individually mated with the outer surfaces of the U-shaped channels 86 and side-tooling sheet members 92. Additional details of the tooling dies 104 will be discussed later with reference to FIGS. 13 and 16. This commonality of the surfaces between the standardized dies 104 of the consolidating structure 102 and the outer surfaces of the channels 86 and sheet members 92 eliminates the need for part-specific, costly matched dies as well as eliminates start up times between different preformed parts having different ply configurations.

The consolidating structure 102 has a pulsating structure 106 that incrementally moves the preformed part 84 forward within the consolidation zone 82 and away from the preforming zone 80. As the part 84 moves forward, the part first enters a heating zone 108 that heats the part to a temperature which allows the free flow of the polymeric component of the matrix resin 40, 42 of the stacks 74, 76 and nuggets 26. Next, the part 84 moves forward to a pressing zone 112, wherein standardized dies 104 are brought down collectively or individually at a predefined force (pressure) sufficient to consolidate (i.e. allow free flow of the matrix resin) the various plies 32, 34 of the tacked stacks 74, 76 and nuggets 26 into its desired shape and thickness, here forming the web region 22 and pair of cap regions 24 of the floor beam 20.

Each die 104 is formed having a plurality of different temperature zones with insulators. The dies 104 do not actually contact the part 84, but contact the outer surfaces of the U-shaped channels 86 and side-tooling sheet members 92 opposite the part 84. Thus, the respective inner surfaces of the channels 86, 92 compress against the portion of the part 84. The compression may occur wherein all of the dies 104 compress in one independent yet coordinated step. The dies 104 are opened, and the part 84 is advanced within the consolidating zone 102 away from the pre-forming zone 80. The dies 104 are then closed again, allowing a portion of the part 84 to be compressed under force within a different temperature zone. The process is repeated for each temperature zone of the die 104 as the part 84 is incrementally advanced along the guide rollers 105 towards the cooling zone 114.

The formed and shaped part 84 then enters a cooling zone 114, which is separated from the pressing zone 112, wherein the temperature is brought below the free flowing temperature of the matrix resin 40, 42, thereby causing the fused or consolidated part to harden to its ultimate pressed shape 116. The pressed part 116 then exits the consolidating structure 102, wherein the side sheet members 92 are re-rolled onto rollers 120 as scrap.

While not shown, the consolidating structure 102 may have additional parts or devices that can introduce shapes or features into the pressed shape 116.

The consolidating zone structure 102 may be a continuous compression molding ("CCM") process. However, other molding processes known to those of ordinary skill in the art are specifically contemplated by the disclosed embodiments, including but not limited to pultrusion or roll forming.

Figure 6:
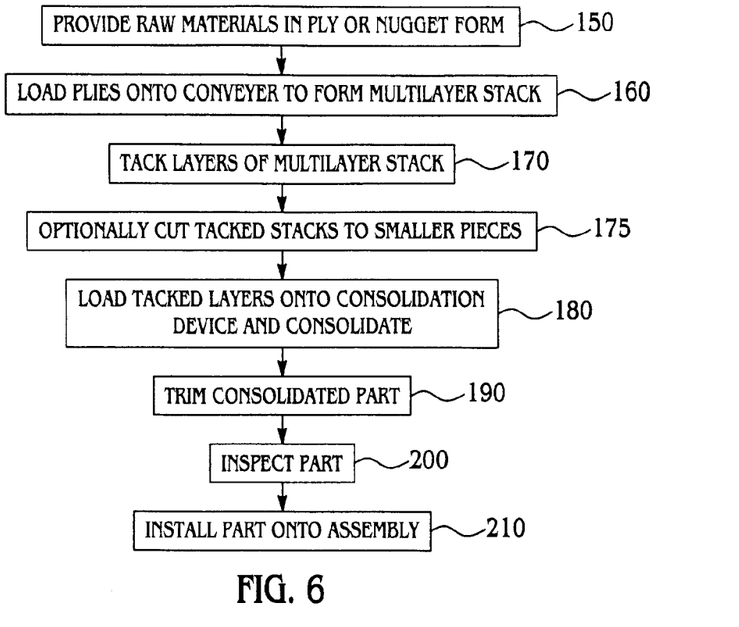
FIG. 6 is a logic flow diagram illustration a method for forming the thermoplastic composite laminate of FIG. 1 in accordance with FIGS. 2-5.

Next, in Step 190, the pressed part 116 is trimmed or otherwise post-processed to its desired final shape to form the thermoplastic composite laminate 20. In Step 200, the laminate 20 is inspected visually, preferably using ultrasonic non-destructive inspection techniques, or by other means to confirm that the laminate 20 is correctly shaped and does not contain any visual or other defects. After inspection, in Step 210, the laminate 20 such as the thermoplastic composite floor beam 20 may be installed onto its assembly. In the case of the floor beam 20, it is introduced within an aircraft fuselage.

While embodiments of the method have been described in terms of forming a thermoplastic composite floor beam 20 having essentially an I-beam shape, other potential shapes are specifically contemplated by the disclosed method. This includes thermoplastic composite laminates having an L-shape, a C-shape, a T-shape, or even a flat panel shape in which thickness transitions may occur in any section of the part. These alternatively shaped laminates, or even other forms of the floor beam 20, are formed by consolidating one or more uniform or non-uniform tacked multi-layer ply sheets 74, 76 with either one or more plies 32 of a thermoplastic composite material 30, one or more partial plies 34 of a thermoplastic material 30, or one or more uniform or non-uniform thickness tacked multi-layer tacked stacks 74, 76, and any combination thereof, in a similar method to that described herein.

Further, one or more filler nuggets 26 may also be used to form additional alternative versions of the thermoplastic composite laminates 20. To accomplish any of these alternative preferred variations, modifications to the tooling within the pre-forming zone 80 is necessary so as to match the desired thickness variations for the TPC laminate 20. For example, the U-shaped tool 86 of FIG. 5 is specific for forming I-beams such as floor beam 20 of FIG. 1, an alternatively shaped tool 86 having gaps 90 is used in forming C-shaped laminates, L-shaped laminates or flat beams having a taper between respective ply layers. Similar to the U-shaped tool 86, these alternative tools include regions not contacting the stacks 74, 76 that are matched to the standardized dies 104 within the consolidating zone 102.

While the disclosed method is ideally suited for forming thermoplastic composite laminates, by using a modified single-step consolidation zone, thermosetting laminate composites can also be formed. In this modified version of the consolidation process, the heating and pressing zones achieve a temperature above the reaction or curing temperature of the matrix resin to form a thermosetting part. Accordingly, the single pressing process achieves a part having its ultimate desired shape without subsequent pressing steps.

The illustrated method provides an innovative method to fabricate complex thermoplastic composite laminates with tailored and varying thickness in a continuous process. This innovative process utilizes automated equipment or hand lay-up to collate parts or components into a multi-layer stack. Each stack contains all plies, including ply build-up areas, tacked in the proper location to maintain orientation and location. The consolidation structure utilizes a two-stage method for forming the composite laminates from the multi-layer stacks and contains all necessary part features to achieve this result. The tooling, such as the U-shaped tool 86 in the pre-forming zone 80 is created with an appropriate shape to create the desired thickness variations in the formed TPC laminates 20 and is further designed to mate with standardized dies with the consolidation zone 82

The composite part formed by the above method may find use in a wide variety of applications, including, for example, automotive and aerospace applications. One example of a composite part formed in accordance with the illustrated method is ideally suited for use as structural stiffened members, including thermoplastic composite laminate floor beams 20, in a commercial aircraft.

The illustrated method may be used to manufacture thermoplastic laminate parts that are both curved and have tailored and/or varying thickness along their length. Curved laminates can be produced in which the curvature is either constant (circular) or variable along the length of the laminate part. As in the case of the embodiment previously described, the curved thermoplastic laminate part may include tailored areas and areas of varying thickness achieved by adding partial or local plies, or areas containing pockets. "Tailored" or "tailoring" refers to the profile of the part surface, wherein the selective addition or reduction of plies in specific areas of the part can be used to achieve a desired surface profile after the plies are consolidated during the compaction process. Curved parts produced by this embodiment of the method may be used in a variety of applications such as frames, rings, formers and structural aircraft stiffened members or fuselage skins, wing skins, door panels and access panels, keel beams, floor beams, and deck beams. The curved parts can be produced with a variety of cross sections.

Figure 7:
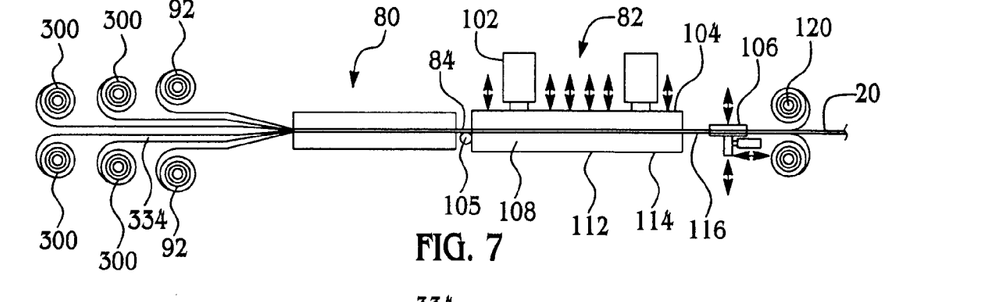
FIG. 7 is an illustration similar to FIG. 4 but showing the use of spools to continuously feed plies of thermoplastic material into the pre-forming zone of the consolidation structure.

Referring now to FIG. 7, a method is provided for the continuous fabrication of thermoplastic composite laminate parts using flat sheets 334 of pre-plied thermoplastic material that is continuously fed into the pre-forming zone 80 from one or more spools 300. Each of the sheets 334 may comprise one or more plies, any or all of which may be reinforced with fibers, such as carbon fibers, for example. The number of spools 300 will depend upon the particular application and the geometry of the part; however the continuously formed part may typically comprise multiple laminated plies of thermoplastic material. The thermoplastic material forming the sheets 334 may comprise any of the thermoplastic materials 30 previously described in reference to FIG. 1. Side tooling sheets 92 or "mandrels" may be fed along with the sheets 334 into the pre-forming zone 80.

Although not specifically shown in FIG. 7, additional materials such as filler nuggets may be fed along with the sheets 334 in order to form specific features of the part. As will be discussed below, the plies forming each of the sheets 334 supplied by each spool 300 may include fibers aligned at differing angles relative to a reference direction of orientation in order to increase the strength and rigidity of the fabricated part. The arrangement shown in FIG. 7 is well suited for continuously fabricating relatively simple parts such as flat beams and beams having an "L" shaped cross section, for example.

Figure 8:
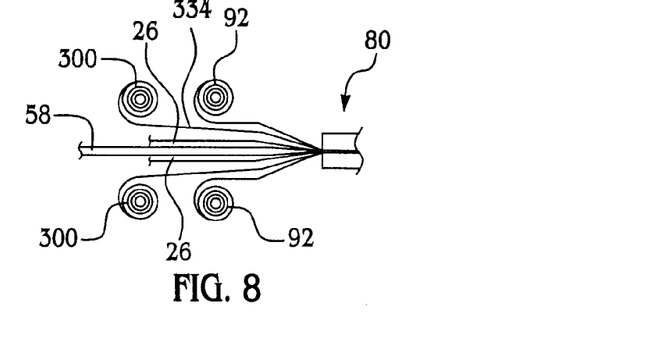
FIG. 8 is a fragmentary illustration showing a pre-formed stack of plies being fed to the pre-forming zone 80 along with plies continuously fed from spools.

As shown in FIG. 8, sheets 334 from spools 300 may be continuously fed into the pre-forming zone 80 along with the previously described multi-layer stack 58 and filler nuggets 26. The multi-layer stack 58 may or may not include tailored thicknesses, pockets or curvatures along its length.

Figure 9:
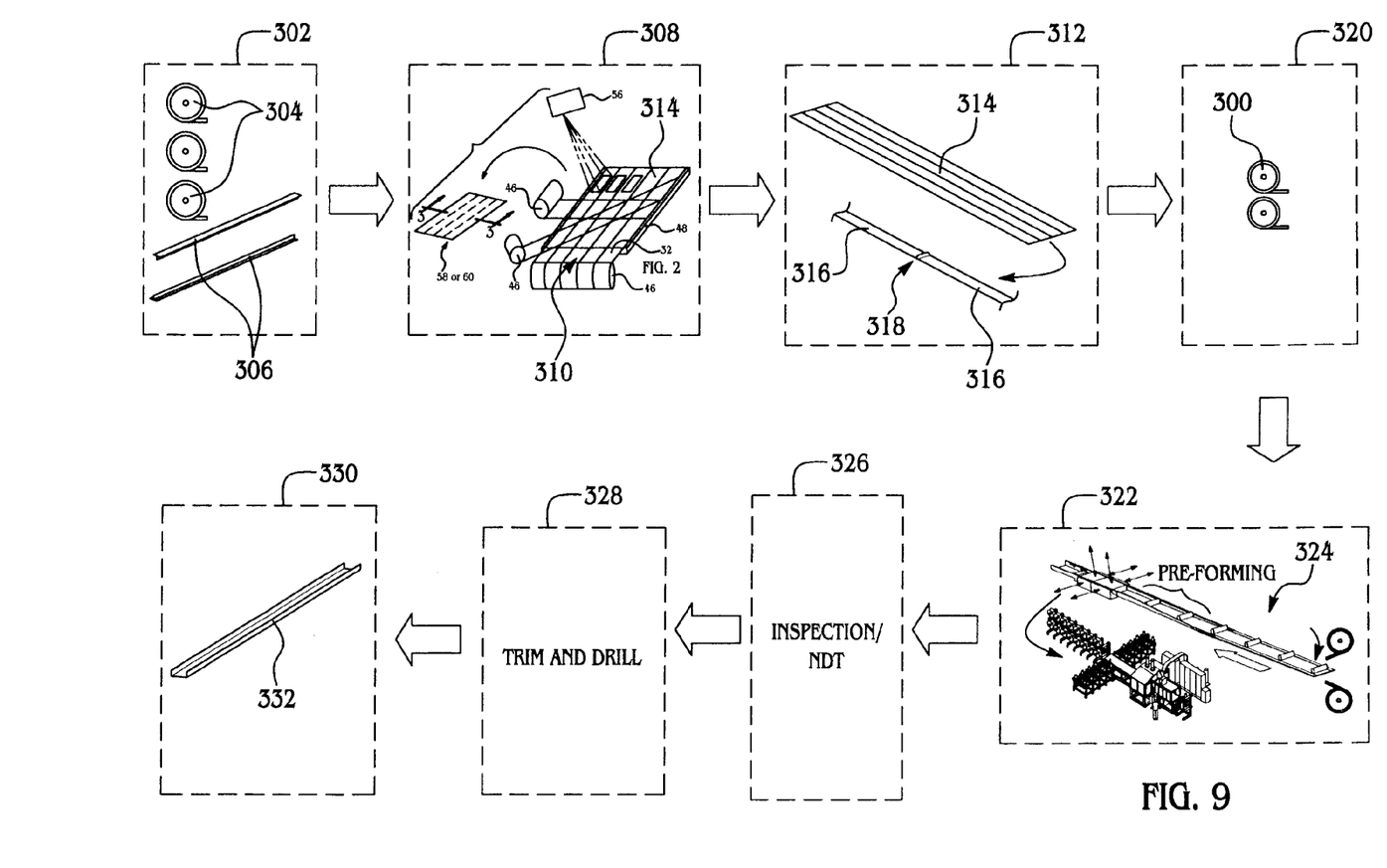
FIG. 9 is a combined block and diagrammatic illustration of the steps performed to continuously fabricate parts using in-feed spools of thermoplastic material.

Referring now to FIG. 9, in one embodiment, the first step in the fabrication method indicated at 302 involves providing the raw materials that will be used in the process. In the illustrated example, these materials comprise rolls 304 of prepreg thermoplastic composite material and pre-cut lengths of filler nuggets 306. The prepreg rolls 304 may comprise woven or knitted fabric material or tape including unidirectional reinforcing fibers such as carbon fibers embedded in the thermoplastic binder. The angular orientation of the fibers in the rolls 304 of prepreg may be the same or different from each other, depending upon the application and the laminate buildup design. Next, at step 308, each of the rolls 304 of prepreg is unrolled into flat sheets 314 that are placed on a cutting machine 310 suitable for making both longitudinal and transverse cuts in the sheet 314.

At step 312, the sheet 314 is cut into longitudinal strips 316 that are then arranged in end-to-end relationship, and welded together at a butt splice 318. The welding may be performed, for example, using a soldering iron or a heat gun. The spliced strips 316 form a sheet 334 that is wound onto spools 300, as shown at step 320.

The foregoing description illustrates the production of spools 300 of strips 316 having a single ply. However, multilayer (multi-ply) sheets 334 may be fabricated by stacking multiple sheets 334 after each of them is formed in the manner shown at step 312. The multiple layers may include reinforcing fibers having any directional orientation. The multilayer stack is tacked together using, for example, a soldering iron or heat gun.

At step 322, the spools 300 of single or multilayer, reinforced thermoplastic material sheets are continuously fed into a continuously operating compression molding line 324 which will be discussed later in more detail. Nuggets 306 may also be fed into the molding line 324, as may be required for particular part. The molding line 324 forms successive sections of a part in a continuous operation. In the illustrated example, the formed part is a structural beam 332 having a C-shape cross section.

The fully formed and consolidated part 332 is inspected and/or subjected to nondestructive testing at step 326. At step 328 the part is trimmed and drilled, as required, to receive fasteners (not shown), depending upon the application. The finished part 332 is then ready for use, at step 330.

Figures 10, 11:
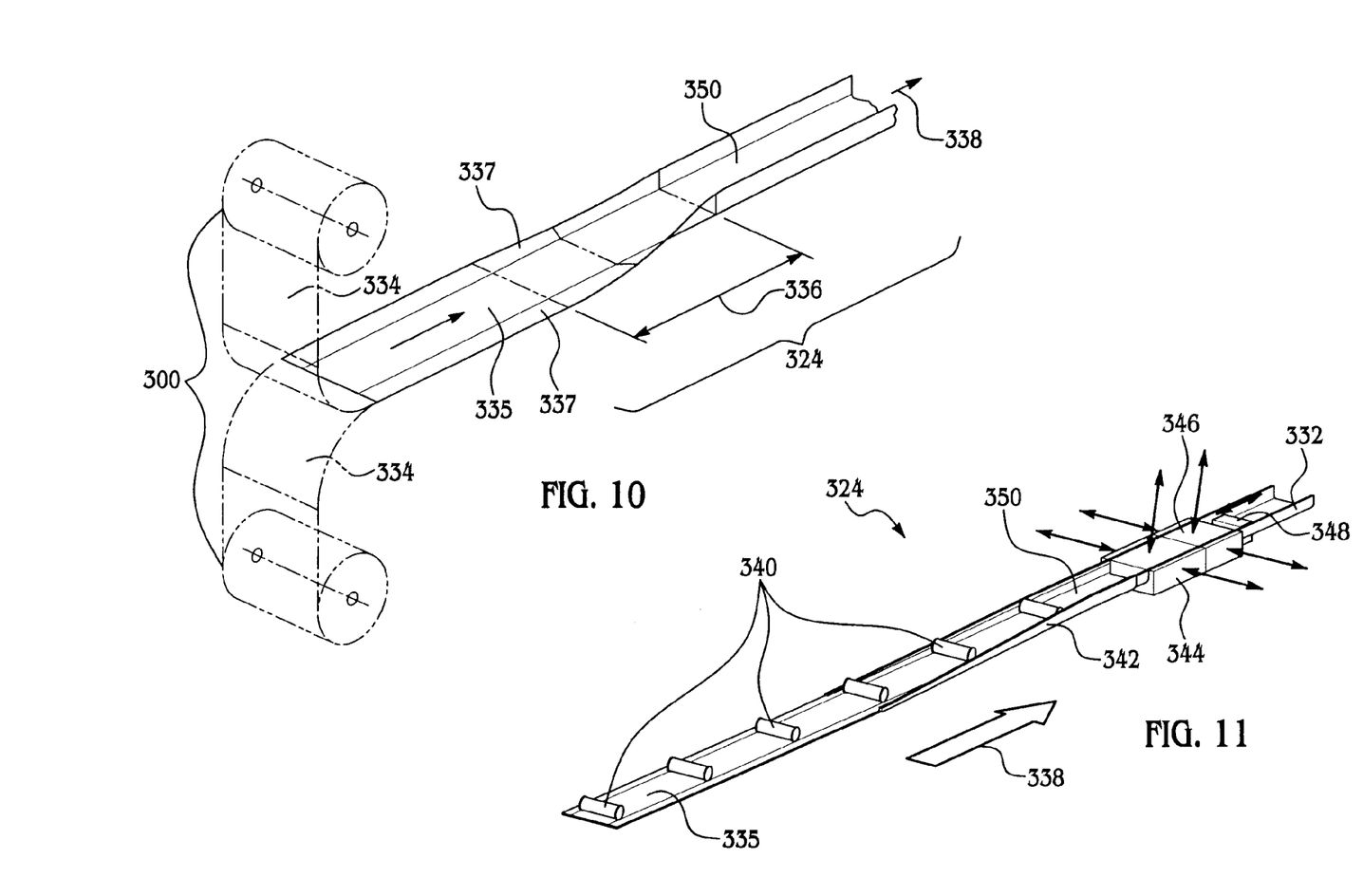
FIG. 10 is a perspective illustration showing plies continuously fed from spools into a pre-forming zone.
FIG. 11 is a perspective illustration showing multiple plies of thermoplastic material continuously flowing through pre-forming and consolidation zones.

FIG. 10 illustrates a pair of sheets 334 being unrolled from spools 300, and continuously fed as a continuous material stack 335 through the molding line 324 in the direction of the arrow 338. The material stack 335 passes through a pre-forming zone 336 where, in the illustrated example, the outer edges 337 are pushed upwardly by tooling (not shown). The fully preformed part 350 emerges from the pre-forming zone 336 and moves forwardly in the direction of arrow 338 toward a consolidation zone (not shown).

Additional details of the compression molding line 324 are shown in FIG. 11. The flat sheets 334 fed continuously fed from spools 300 (FIG. 10) are maintained as a continuously moving flat material stack 335 by pressure rollers 340. A pre-forming tool 342 engages the edges 337 of the flat material stack 335 and deforms these edges 337 upwardly as the stack 335 moves in the direction of the material flow 338. The preformed part 350 then enters a continuously operating compression molding press 345, comprising a press unit 344, a cooling zone 346 and a pulsating unit 348. The details of the compression press 345 are similar to those described with respect to the molding line shown in FIG. 4.

The press unit 344 contains appropriate tooling (not shown) for pressing the material plies together and may be heated in order to elevate the polymeric component of the matrix resin in the stack 335 to its free-flowing temperature. The cooling zone 346 cools the polymeric component below the free-flow temperature, thereby causing the fused or consolidated part 332 to harden to its ultimate pressed shape. As previously described with reference to FIG. 4, the pulsating unit 348 incrementally moves the part 332 forward through the compression press. The entire length of the material stack 335, preformed part 350 and partially formed part 332 move continuously, in incremental steps through the fabrication line 324. During each incremental movement, a portion of the flat material stack 335 is preformed by the tool 342, while the press unit 344 compresses a portion of the preformed part 350 that has just entered the press unit 344.

Figure 12:
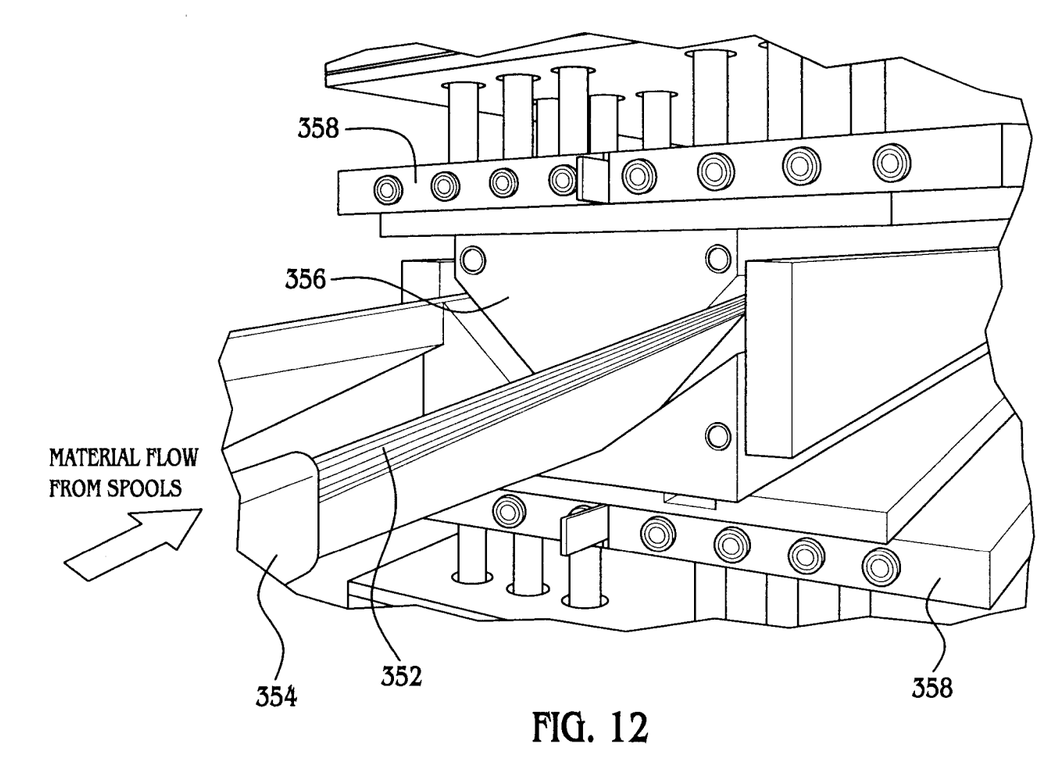
FIG. 12 is a perspective illustration showing preformed plies entering a continuous compression molding press.

FIG. 12 better illustrates a preformed part 352 having an L-shape cross section exiting from a pre-forming tool 354 and entering consolidation tooling 356 within a compression press 358. In this example, the tooling 356 possess mating, L-shaped surfaces which engage corresponding portions of the preformed part 352 in order to consolidate the material plies.

Figure 13:
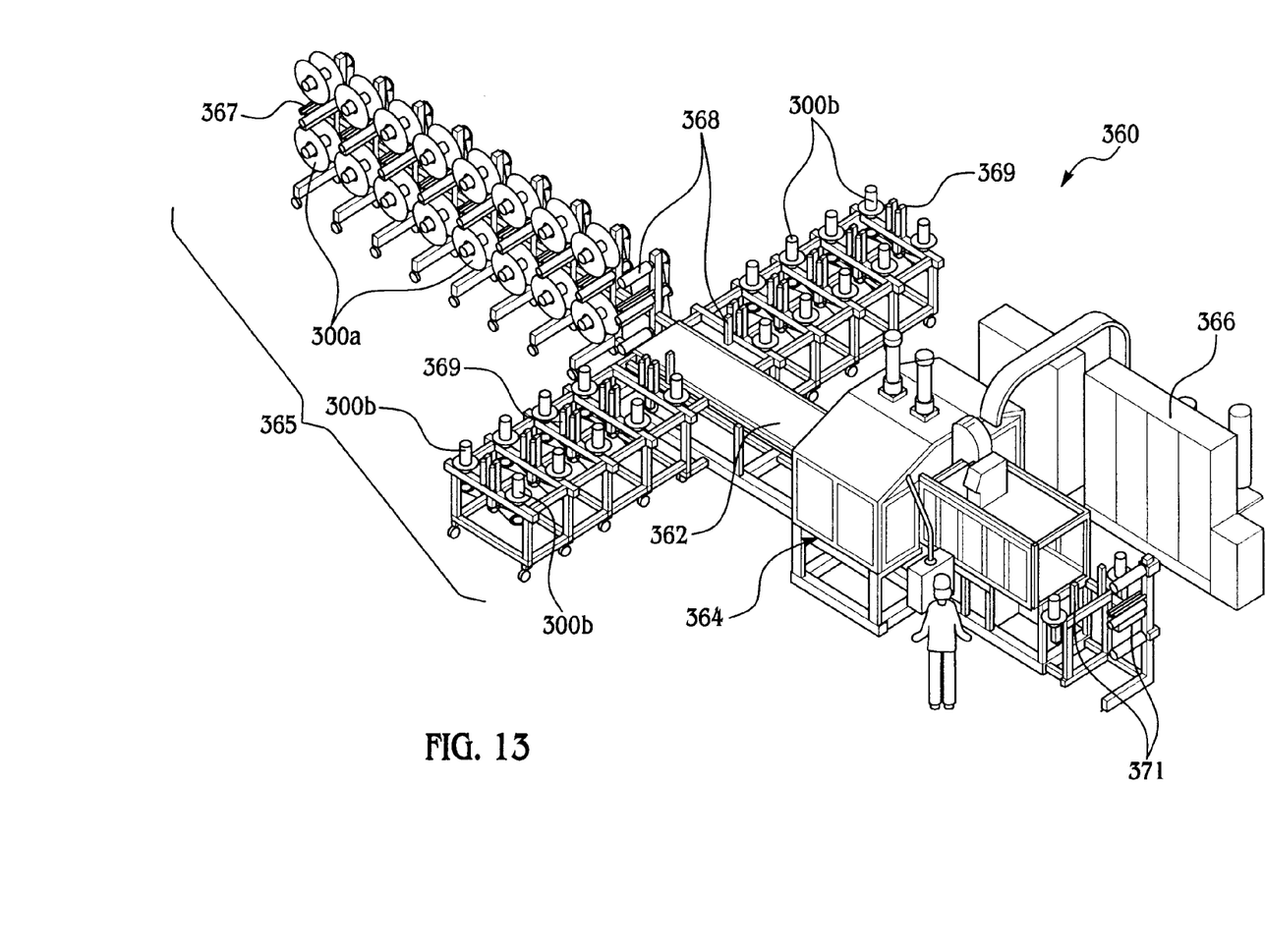
FIG. 13 is a perspective illustration of a continuous compression molding machine including multiple spools of thermoplastic material for use in forming parts.

Attention is now directed to FIG. 13 which shows a continuous compression molding line 360 that may be employed to form a variety of laminated thermoplastic composite parts having any of various geometries. The line 360 includes a material supply section 365 comprising two sets of material supply spools 300a, 300b. Spools 300a have their rotational axes disposed horizontally so that the sheets dispensed from the spools 300a lie flat (horizontal) as they are continuously fed into a pre-forming unit 362. Rollers 367 hold the dispensed sheets flat as they are combined into a flat material stack and fed to the pre-forming unit 362.

The axes of the spools 300b are disposed vertically so that the sheets dispensed from these spools have their flat surfaces vertically oriented. The sheets dispensed from spools 300b are guided and combined by guide rollers 369. The single or multi-ply sheets dispensed from spools 300a, 300b are continuously fed into the pre-forming unit 362 where the sheets are combined and preformed into a desired part. The preformed part then moves through a consolidation area 364 which includes the continuously operating compression molding press previously described along with a pulsating unit (not shown). The fully-formed part exits the line 360 where it is guided and supported by rollers 371. Control units 366 are provided which may include electrical controls, a hydraulic system and a computerized controller, for example.

Figure 14:
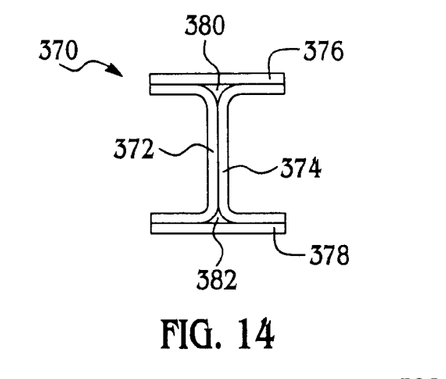
FIG. 14 is a cross sectional illustration of an I-beam manufactured by the method according to an embodiment.

The molding line 360 shown in FIG. 13 may be used to fabricate, for example, the I-beam 370 shown in FIG. 14. I-beam 370 includes a pair of C-shaped sections 372, 374 arranged back-to-back, a pair of caps 376, 388 and a pair of filler nuggets 380, 382, respectively. The C-shaped sections 372, 374 as well as the caps 376, 388 are each formed from material stacks comprising the sheets continuously fed from the spools 300a, 300b.

Figure 15:
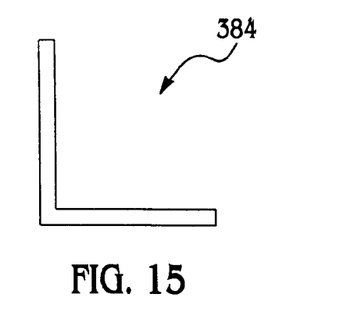
FIGS. 15-19 are cross sectional illustrations of parts having various geometries manufactured in accordance with embodiments of the disclosure.
Figure 16:
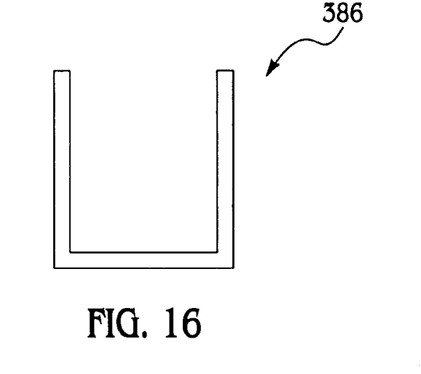
Figure 17:
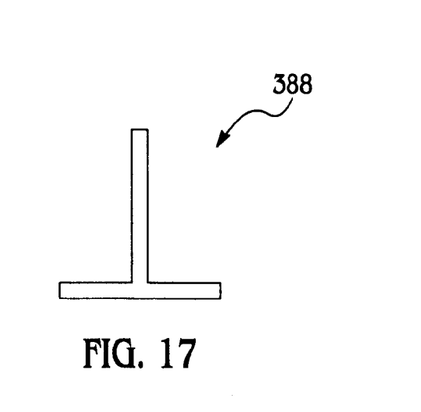
Figure 18:
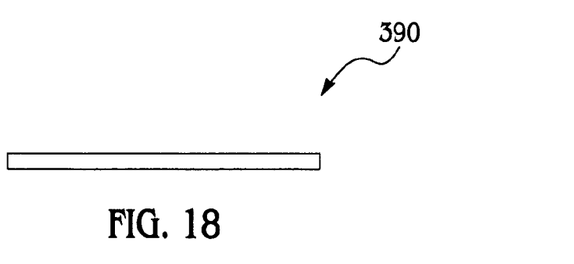
Figure 19:
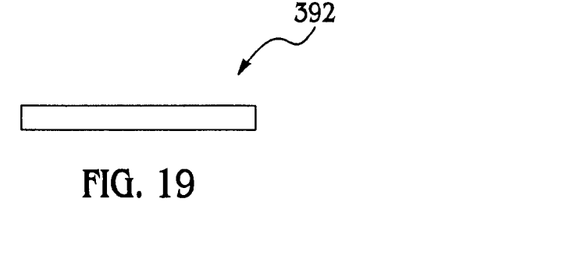

Parts such as structural beams having other geometries may be formed according to the disclosed embodiments, including those, for example, shown in FIGS. 15-19. FIG. 15 illustrates a beam 384 having an L-shape cross section. FIG. 16 illustrates a beam 386 having a U-shaped cross section. FIG. 17 illustrates a beam 388 having a T-shaped cross section. FIG. 18 shows a flat beam or structural member 390. Finally, FIG. 19 illustrates a flat beam 392.

Figure 20:
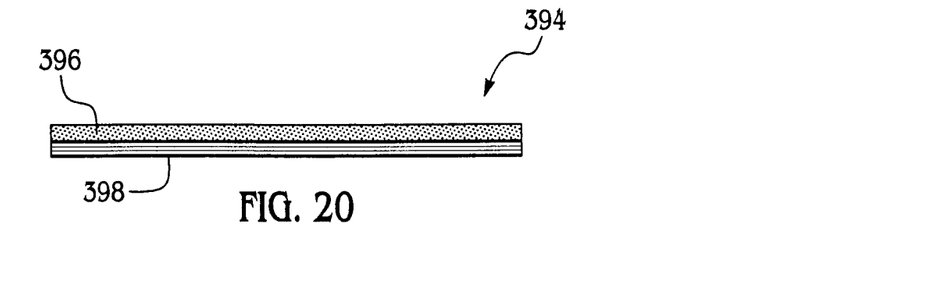
FIG. 20 is a longitudinal, sectional illustration of a two-ply thermoplastic material respectively having reinforcing fibers arranged perpendicular to each other.
Figure 21:
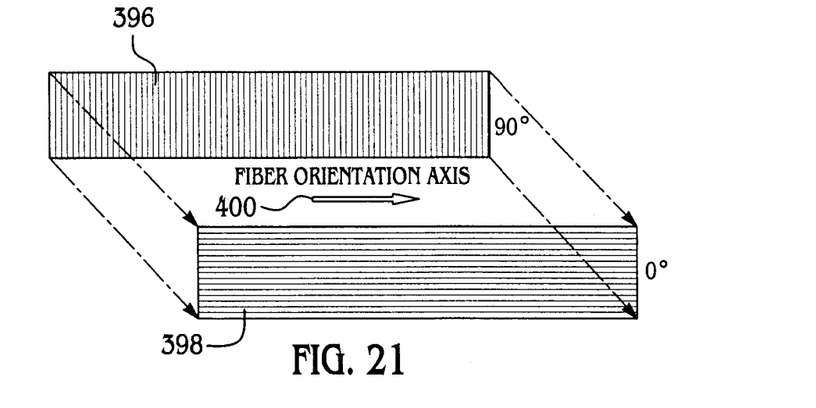
FIG. 21 is an exploded, perspective illustration of the two plies shown in FIG. 20.

As previously indicated, the sheet 334 of reinforced thermoplastic material wound onto the spools 300 may have multiple plies or layers in which the reinforcing fibers are arranged at more than one angle relative to an orientation reference axis. For example, as shown in FIG. 20, a double ply sheet 394 includes a top ply 396 and bottom ply 398. Each of the plies 396, 398 includes unidirectional reinforcing fibers, such as carbon fibers. The fibers in the top ply 396 extend transversely or at a 90 degree angle, relative to a fiber orientation axis 400, as shown in FIG. 21, which is parallel to the length of the sheet 394. The fibers in the bottom ply 398, however, are arranged at a 0 degree angle, or in other words the fibers in the bottom ply 398 extend parallel to the length of the sheet 394 and the orientation axis 400.

Figure 25:
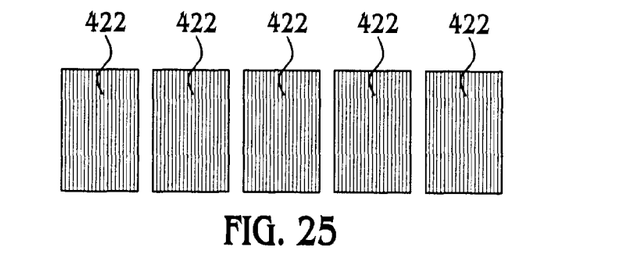
FIG. 25 is a view illustration similar to FIG. 24 but showing the sections having been rotated 90 degrees.

Referring now to FIGS. 20-27, a first length of fiber reinforced material such as tape 420 is unwound from a roll 418. Tape 420 includes unidirectional reinforcing fibers that extend longitudinally along the length of the tape 420 and thus parallel to the orientation reference axis 400 (FIG. 21). Next, at step 404, the unrolled length of tape 420 is cut transversally and separated into a plurality of separate sections 422. Then, at step 406, the sections 422 are rotated a pre-selected amount, which in the illustrated example is 90 degrees, as shown in FIG. 25. At step 408, the rotated sections 422 are placed in end-to-end abutment with each other and the joints 424 between sections 422 are joined by melting the resin binder, using a heat gun or soldering iron.

Figure 22:
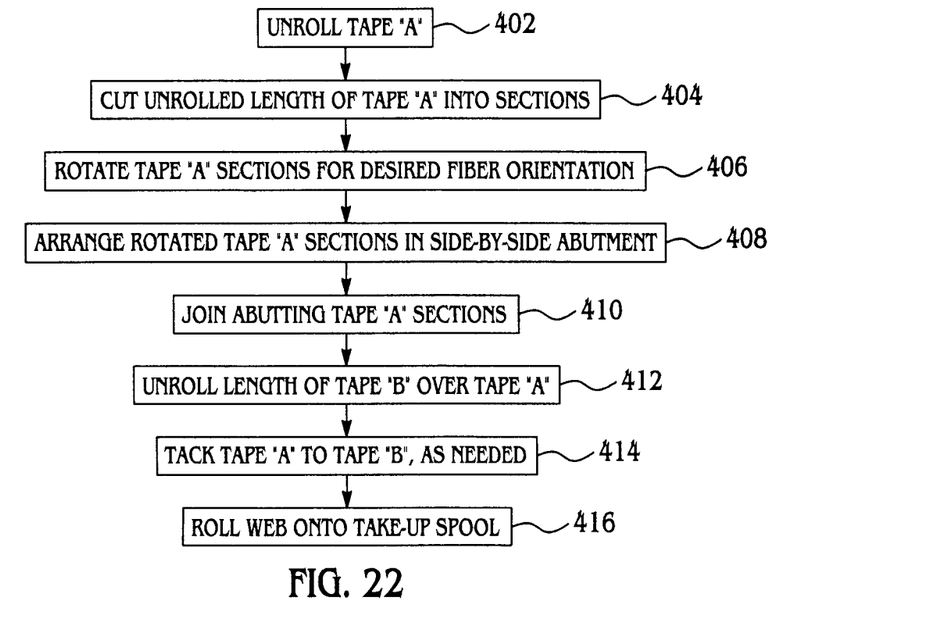
FIG. 22 is a flow diagram illustration of a method for forming the two-ply material shown in FIG. 20.
Figure 23:
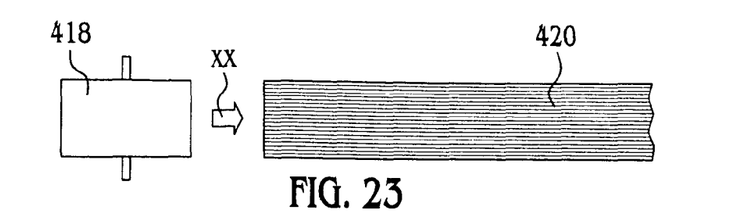
FIG. 23 is a plan view illustration showing a single ply of thermoplastic material having been unwound from a supply roll.
Figure 24:
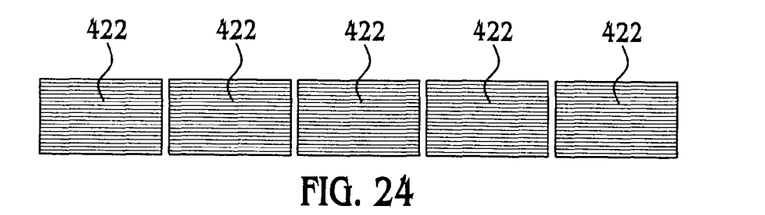
FIG. 24 is a plan view illustration showing the single ply of material of FIG. 23 having been cut into sections.
Figure 26:
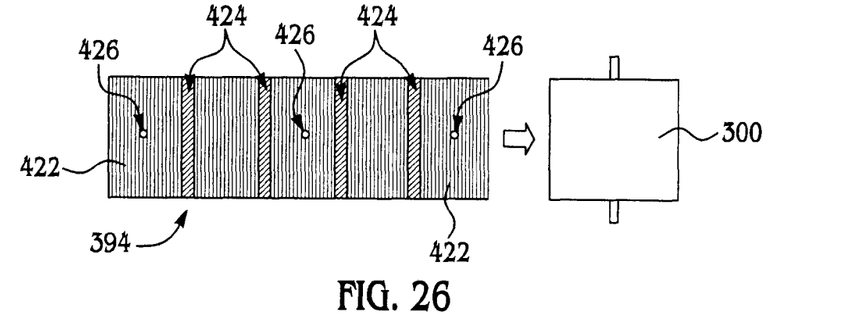
FIG. 26 is a plan view illustration showing the sections of FIG. 25 having been tacked together to form a single length in preparation for being wound onto a spool.
Figure 27:
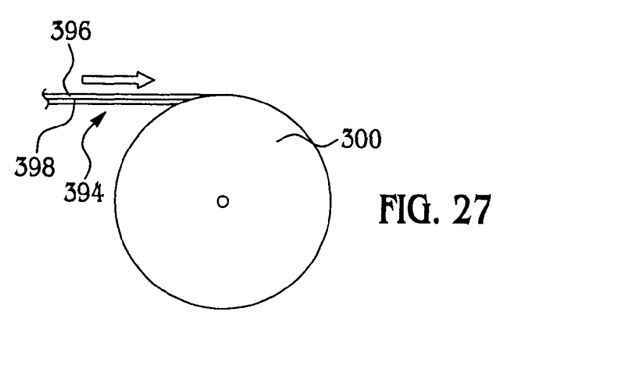
FIG. 27 is a side view illustration of the material shown in FIG. 26 being rolled onto the spool.

Next, a second length of tape is unwound from a supply roll and is placed beneath the joined sections 422 which form a continuous ply. At step 414 the two plies 396, 398 are tacked together at 426 using a heat gun or soldering iron so that the edges of these two plies 396, 398 remain in registered relationship, and the plies may be wound or unwound from a spool 300 as a single sheet 394. Other methods may be used for connecting the plies 396, 398, such as passing these plies through an oven so as to heat the resin matrix just above their melting temperatures so as to bond the plies 396, 398 together. Finally, at step 416 the sheet 394 is wound onto a spool 300.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method comprising:
feeding a first length of thermoplastic material from a first spool, wherein the first length of thermoplastic material comprises generally parallel fibers, and wherein feeding further comprises:
receiving the first length of thermoplastic material from the first spool;
dividing the first length of thermoplastic material into separate sections;
rotating the separate sections to change angles of the generally parallel fibers in the separate sections relative to a reference direction of fiber orientation, wherein rotated sections are formed; and
joining the rotated sections together to form a second length of thermoplastic material; and
winding the second length of thermoplastic material onto a second spool.

2. The method of claim 1, wherein joining is performed by melting together abutting areas of the rotated sections.

3. The method of claim 1, further comprising:
placing the second length of thermoplastic material in registered relationship over a second length of tape such that the second length of thermoplastic material and the second length of tape are in face-to-face contact, and
tacking together the second length of thermoplastic material and the second length of tape.

4. The method of claim 1, wherein an aircraft part is made from the second length of thermoplastic material.

5. A method of manufacturing a reinforced thermoplastic or laminate part in a continuous compression molding process, comprising the steps of:
continuously feeding a multi-ply thermoplastic material from at least one spool into a preforming structure, said multi-ply thermoplastic material previously plied by tacking together plies of fiber reinforced thermoplastic material, wherein making said previously plied thermoplastic material further includes the steps of:
providing a length of a thermoplastic material reinforced by generally parallel fibers;
dividing the length of the thermoplastic material into separate lengths;
rotating ones of the separate lengths to change an angle of the fibers in each section relative to a reference direction of fiber orientation; and joining rotated separate lengths together to form a continuous length of material;

preforming the part in the preforming structure using the multi-ply thermoplastic material, such that a preformed part is formed;

continuously feeding the preformed part through a press as the multi-ply thermoplastic material is continuously fed; and pressing the preformed part between dies to compact and shape the plies of fiber reinforced thermoplastic material while heating said plies.

6. The method of claim 1 further comprising:

preforming a part in a preforming structure using the second length of thermoplastic material to form a preformed part;

feeding the preformed part through a press; and pressing the preformed part between dies to compact and shape the continuous length of thermoplastic material.

7. The method of claim 6, further comprising:

additionally feeding a set of tooling into the preforming structure.

* * * * *